United States Patent
Shiga

(10) Patent No.: US 8,364,190 B2
(45) Date of Patent: Jan. 29, 2013

(54) PUSH TO TALK MOBILE STATION, MOBILE COMMUNICATION SYSTEM, AND PROGRAM

(75) Inventor: Noritake Shiga, Hirakata (JP)

(73) Assignee: Kyocera Corporation, Kyoto (JP)

( * ) Notice: Subject to any disclaimer, the term of this patent is extended or adjusted under 35 U.S.C. 154(b) by 631 days.

(21) Appl. No.: 12/563,884

(22) Filed: Sep. 21, 2009

(65) Prior Publication Data

US 2010/0009709 A1   Jan. 14, 2010

Related U.S. Application Data

(62) Division of application No. 10/895,725, filed on Jul. 21, 2004, now Pat. No. 7,620,411.

(30) Foreign Application Priority Data

Jul. 31, 2003  (JP) ................................ 2003-284531

(51) Int. Cl.
*H04W 40/00* (2009.01)
*H04B 7/00* (2006.01)
(52) U.S. Cl. ......................... 455/518; 455/519; 455/428
(58) Field of Classification Search .................. 455/428, 455/518, 519
See application file for complete search history.

(56) References Cited

U.S. PATENT DOCUMENTS

| | | | |
|---|---|---|---|
| 5,355,518 A * | 10/1994 | Kindinger et al. | ........... 340/7.34 |
| 5,845,204 A * | 12/1998 | Chapman et al. | .......... 455/343.1 |
| 6,519,239 B1 | 2/2003 | Panchal et al. | |
| 6,526,377 B1 | 2/2003 | Bubb | |
| 6,532,418 B2 | 3/2003 | Chun et al. | |
| 6,813,256 B1 | 11/2004 | Nevo et al. | |
| 6,865,398 B2 | 3/2005 | Mangal et al. | |
| 7,170,863 B1 | 1/2007 | Denman et al. | |
| 7,230,930 B2 | 6/2007 | Ahya et al. | |
| 7,245,940 B2 | 7/2007 | Serbin et al. | |
| 7,283,833 B2 | 10/2007 | Fukui et al. | |
| 7,328,042 B2 | 2/2008 | Choksi | |
| 7,446,795 B2 | 11/2008 | Rengaraju et al. | |
| 7,466,795 B2 | 12/2008 | Eberhard et al. | |
| 7,478,129 B1 * | 1/2009 | Chemtob | ...................... 709/204 |
| 2002/0037735 A1 | 3/2002 | Maggenti et al. | |
| 2002/0173325 A1 | 11/2002 | Rosen et al. | |
| 2002/0191583 A1 | 12/2002 | Harris et al. | |
| 2003/0114156 A1 | 6/2003 | Kinnavy | |
| 2004/0219940 A1 | 11/2004 | Kong et al. | |
| 2004/0266468 A1 * | 12/2004 | Brown et al. | .................. 455/518 |
| 2005/0122923 A1 | 6/2005 | Jang et al. | |
| 2006/0035658 A1 | 2/2006 | Yoon et al. | |
| 2006/0136630 A1 | 6/2006 | Eid et al. | |
| 2007/0004469 A1 * | 1/2007 | Arimitsu | ........................ 455/574 |
| 2008/0119199 A1 * | 5/2008 | Hamano et al. | ................ 455/455 |

FOREIGN PATENT DOCUMENTS

| | | |
|---|---|---|
| JP | 2000-209147 | 7/2000 |
| JP | 2005-514803 | 5/2005 |
| WO | 02/093953 | 11/2002 |

* cited by examiner

*Primary Examiner* — Andrew Wendell

(57) ABSTRACT

A mobile station 100 monitors, in Slotted mode, a Paging Channel Slot in a monitor cycle. The mobile station 100 includes: a user interface 53 which receives a PTT setting operation from a user for setting a PTT (Push to Talk) mode; a PTT communication control unit 51 which transmits an allocation request to the radio base station when the PTT setting operation is received; a slot cycle switching unit 52 which switches, when the PTT setting operation is received, the monitor cycle to a predetermined short cycle which is shorter than a cycle at the time of receiving the PTT setting operation; and a voice signal processing unit 40 which receives a voice packet after a PTT CALL is detected in a message transmitted from the radio base station to the mobile station, and reproduces a voice based on the voice packet.

17 Claims, 5 Drawing Sheets

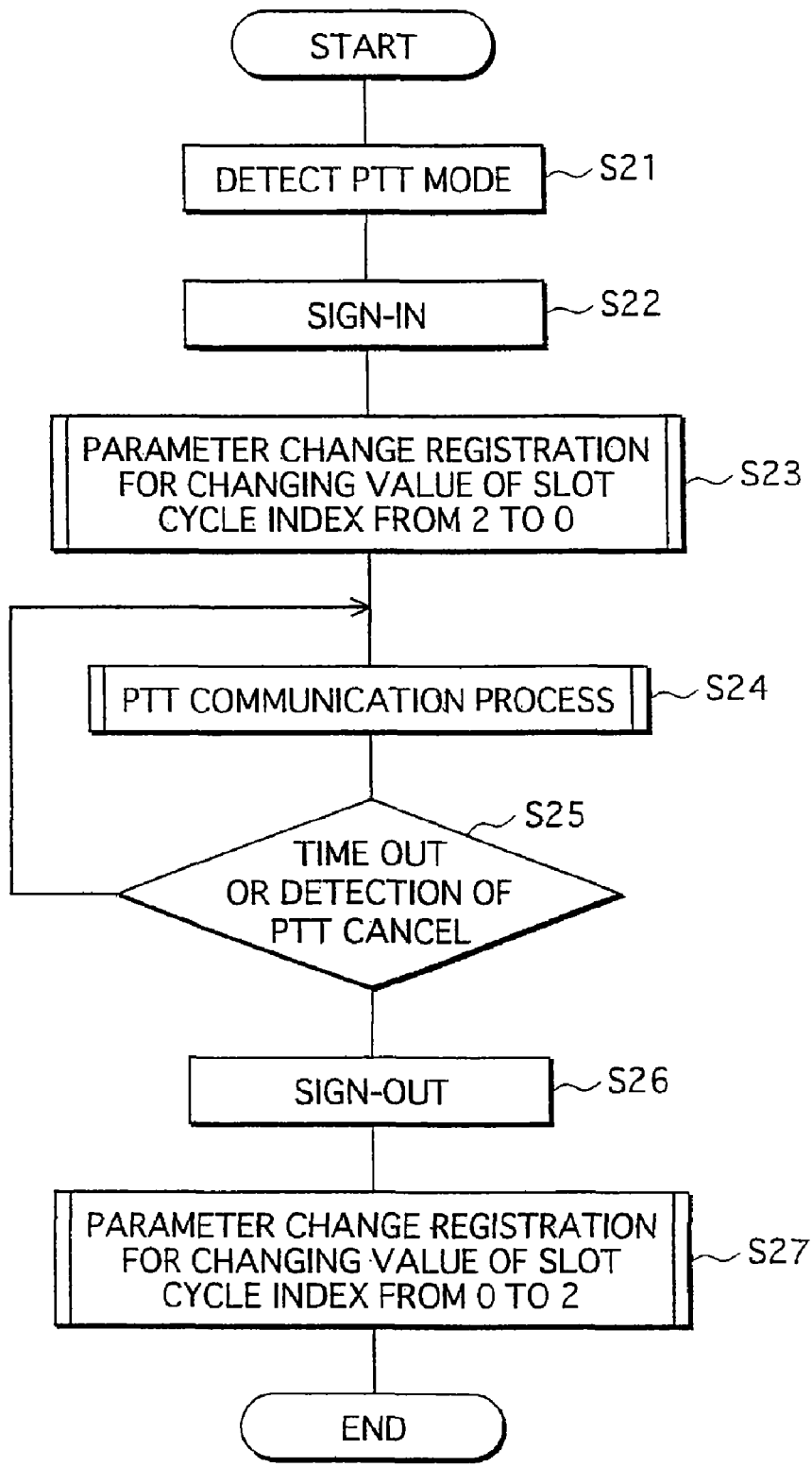

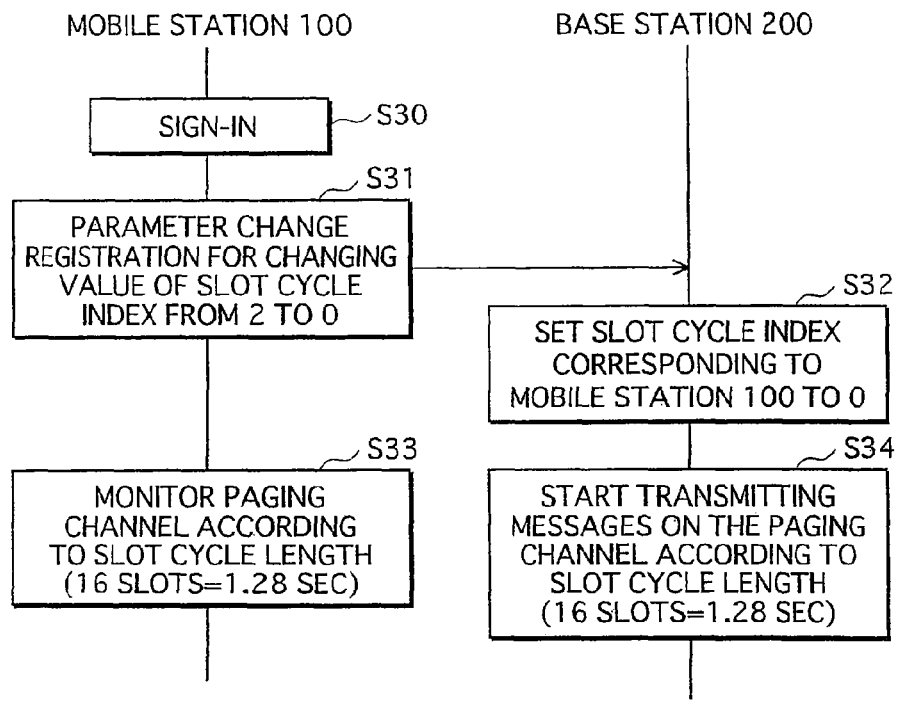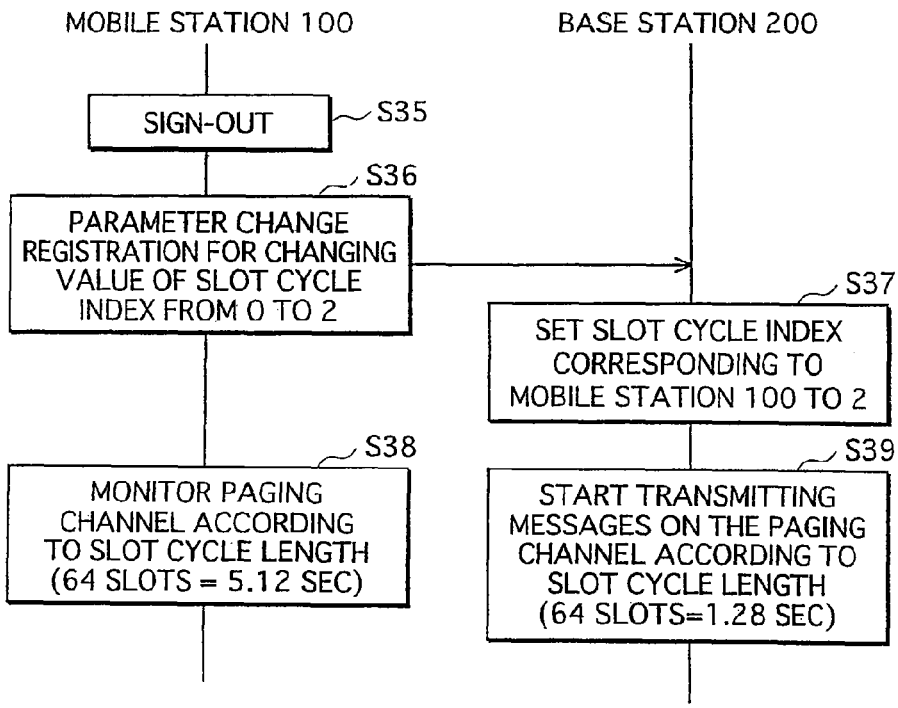

PUSH TO TALK MOBILE STATION, MOBILE COMMUNICATION SYSTEM, AND PROGRAM

This application is a divisional application of U.S. patent application Ser. No. 10/895,725 filed on Jul. 21, 2004, now U.S. Pat. No. 7,620,411. This application is also based on an application No. 2003-284531 filed in Japan, content of which is hereby incorporated by reference.

BACKGROUND OF THE INVENTION (1) Field of the Invention

The present invention relates to a mobile communication system having a PTT (Push to Talk) function.

(2) Description of the Related Art

In recent years, some mobile stations in a CDMA system have a PTT function, which is for transmitting voice to other mobile stations by just pushing a PTT (Push to Talk) button like a transceiver. During a PTT mode, an IP address is allocated to a mobile station having the PTT function, and when the PTT button of the mobile station is pushed, the user's voice is taken in, packetized, and transmitted to another mobile station having an IP address, via an IP network (e.g. Japanese published unexamined application No. 2000-209147).

However, in the PTT mode, it takes a long time for voice packets transmitted from one mobile station to reach another mobile station.

A major cause of this problem is that procedures for transmitting voice packets include a procedure for transmitting messages from a base station to a mobile station on a Paging Channel, such as an allocation of a Traffic Channel for transferring voice packets and notification of incoming voice packets. This procedure for transmitting massages is performed only at a predetermined frequency, not at all times.

More specifically, the CDMA system provides a Slotted mode for saving power for a mobile station. During this mode, the Paging Channel, which is for notification of control information, pages, and so on, is divided into slots (called "Paging Channel Slots"), each of which is 80 ms long. A mobile station monitors only a specific Paging Channel Slot in cycles (called "Slot Cycles"). While a mobile station operates in this mode, a base station accordingly uses only the specific Paging Channel Slot in cycles for transmitting messages, such as control information and notification of incoming calls. The duration time of the Slot Cycle in idle mode is generally 5.12 sec. Therefore, it takes a half of the duration time on average, that is to say, it takes 2.56 sec to transmit one message. The length of the duration time is not a major problem in the case of transmitting messages for notification of incoming calls. However, it is a big problem in the PTT communications, because every time a user pushes the PTT button to speak, the user has to wait 2.56 sec on average for each Paging Channel Slot in both transmission and reception. The duration time hinders a seamless conversation between users.

SUMMARY OF THE INVENTION

The object of the present invention is therefore to provide a mobile station which reduces the delay time in a voice packet transmission with use of the PTT function.

To fulfill the above object, the present invention is made to set the Slot Cycle in the PTT mode to be shorter than that in a normal idle mode.

The present invention is a mobile station which (i) monitors, in a monitor cycle, a Paging Channel Slot which stores a message therein and is transmitted by a radio base station in a transmission cycle, and (ii) performs a process according to the message, comprising: a PTT setting reception unit operable to receive a PTT setting operation from a user for setting a PTT (Push to Talk) mode, in which a voice packet communication is available; a monitor cycle switching unit operable to switch, when the PTT setting reception unit receives the PTT setting operation, the monitor cycle to a predetermined short cycle which is for the PTT mode and shorter than cycles for other modes; and a voice reproduction unit operable to receive a voice packet which is transmitted from the radio base station after a PTT CALL is detected in the message, and reproduce a voice based on the voice packet, the PTT CALL being a request for the voice packet communication.

With the stated construction, the Paging Channel Slot becomes shorter than that in the normal idle mode or other than the PTT mode. Therefore, a delay time in a message transmission on the paging channel, such as notifications of an incoming PTT and a channel allocation, becomes shorter. As a result, the delay time in the voice packet communication is to be reduced.

Also, the mobile station may further comprise: a sign-in unit operable to transmit an allocation request to the radio base station when the PTT setting reception unit receives the PTT setting operation, the allocation request being for allocating, to the mobile station, an IP address which is required for the voice packet communication.

The sign-in unit may also transmit, to the radio base station, slot cycle index information when the PTT setting reception unit receives the PTT setting operation, the slot cycle index information specifying the transmission cycle.

With the stated construction, the slot channel can be changed with use of the Parameter Change Registration provided by the CDMA system. The Parameter Change Registration is a procedure for a mobile station to notify a base station of change of various parameters.

Also, the mobile station may further comprise: a cycle selection reception unit operable to receive a cycle selection by a user, the cycle selection specifying a cycle which is to be applied as the monitor cycle for the PTT mode, the cycle being shorter than the cycles for other modes, wherein the slot cycle index information indicates the cycle specified by the cycle selection, and the monitor cycle switching unit switches the monitor cycle to the cycle specified by the cycle selection when the PTT setting reception unit receives the PTT setting operation.

With the stated construction, during the PTT mode, the mobile station can present a list of Slot Cycle lengths. According to a Slot Cycle length selected by a user, the mobile station performs a Parameter Change Registration at the base station to change the Slot Cycle. By this operation, the user can select a Slot Cycle according to the situation. For instance, the user can select a longer cycle for saving power of the mobile station, or a shorter cycle for reducing the delay time during the PTT communication.

Also, the mobile station may further comprise: a transmission request reception unit operable to receive, from the user, a transmission request which specifies a transmission destination and instructs the mobile station to transmit a voice packet to the transmission destination; and a voice packet transmission unit operable to transmit a voice packet according to a voice inputted by the user.

With the stated construction, when receiving a request from the user for transmitting a voice packet, the mobile station notifies the base station of the PTT transmission. The base station, which received the notification, allocates a Traffic Channel to the mobile station, and the voice packet transmission becomes available. When detecting that, the mobile station transmits the voice packet. Here, the Slot Cycle of the Paging Channel, on which the allocation of the Traffic Channel is transmitted, is shorter than that in normal idle mode. As a result, the period between the reception of the instruction from the user and the transmission of the voice packet becomes shorter on average.

Also, the mobile station may further comprise: a PTT cancel reception unit operable to receive a PTT cancel operation from the user for canceling the PTT mode; and a sign-out unit operable to transmit a release request to the radio base station when the PTT cancel reception unit receives the PTT cancel operation, the release request being for releasing the IP address allocated to the mobile station, wherein the monitor cycle switching unit switches the monitor cycle to a predetermined long cycle which is longer than a cycle at a time of receiving the PTT cancel operation.

With the stated construction, the mobile station can switch the Slot Cycle back to the longer cycle than that in PTT mode, for saving power.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the Drawings:

FIG. 2 is a flowchart showing a communication control process performed by a PTT communication control unit 51;

FIG. 3A shows details of a process for registering a parameter change performed in step S22;

FIG. 3B shows details of a process for registering a parameter change performed in step S27;

DESCRIPTION OF THE PREFERRED EMBODIMENT

The following describes, with reference to figures, a mobile communication system according to a preferred embodiment of the present invention.

Figure 1:
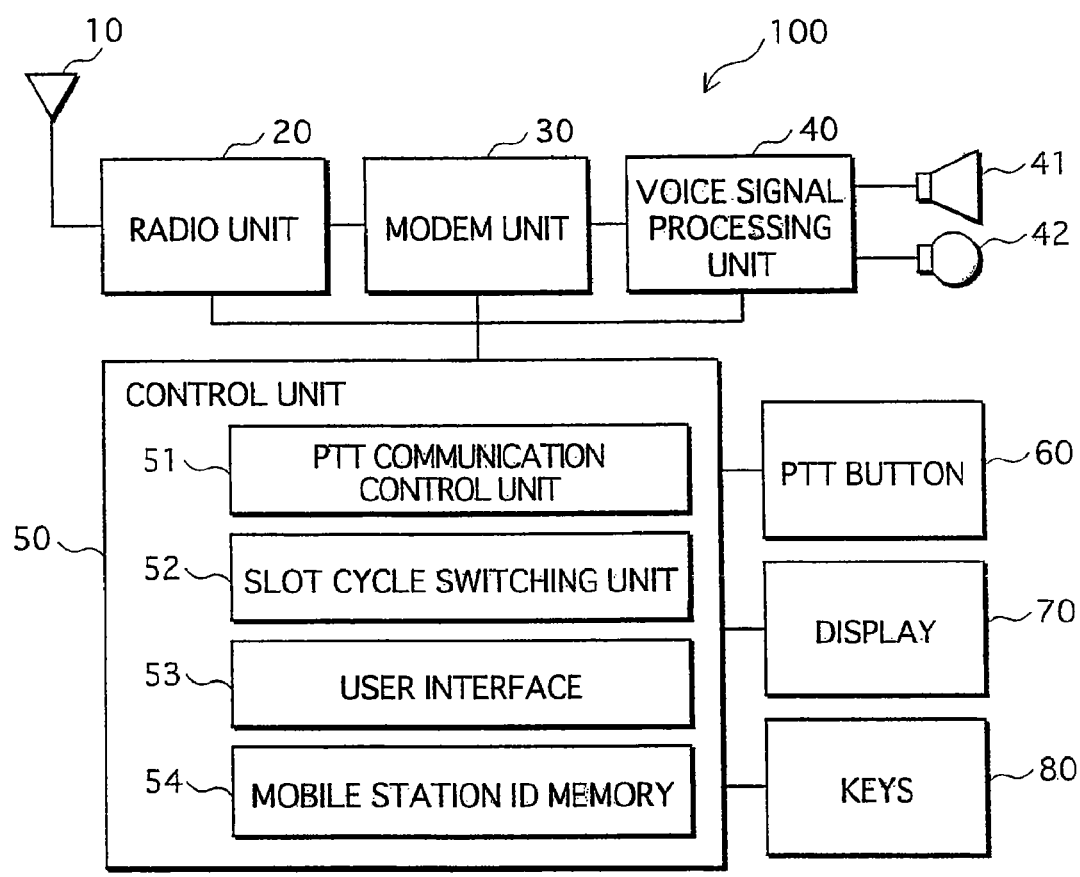
FIG. 1 is a block diagram showing the structure of a mobile station 100 in a CDMA system.

FIG. 1 is a block diagram showing the structure of a mobile station 100 in a CDMA system.

In FIG. 1, the mobile station 100 includes an antenna 10, a radio unit 20 including a high-frequency circuit, a modem unit 30 including a modem circuit and a signal processing circuit, a voice signal processing unit 40 for converting a voice signal from a digital signal into a analog signal and vice versa, a speaker 41 for outputting a voice signal, a microphone 42 for inputting a voice signal, a control unit 50, a PTT button 60, a display 70, and keys 80.

The PTT button 60 includes a button jutting from the surface of a casing of the mobile station, and a mechanism for detecting that the PTT button 60 is pushed and released and notifying the control unit 50 of those actions.

The control unit 50 includes a CPU, a ROM, a RAM, and so on, which are not shown in the figures. This control unit 50 performs common control processes for portable phones, such as communication control, and specific processes of the present invention relating to the PTT function.

For performing the specific processes, the control unit 50 includes a PTT communication control unit 51, a slot cycle switching unit 52, a user interface 53, and a mobile station ID memory for storing mobile station IDs.

Note that the processes of the PTT communication control unit 51, slot cycle switching unit 52, and a user interface 53 are realized by various programs executed by the CPU. Also note that the mobile station ID memory 54 is an area included in the ROM. The functions of these units are described with FIG. 2 and later.

FIG. 2 is a flowchart representing the communication control process performed by the PTT communication control unit 51. This process starts when the mode of the mobile station 100 is switched from a normal idle mode, which is for communicating with use of the circuit switching, to the PTT mode, which is for communicating with use of the PTT function, and finishes when the PTT mode is cancelled.

Firstly, the PTT communication control unit 51 detects that the PTT mode is set (step S21). This detection is performed in such a manner that the PTT communication control unit 51 detects that a user switches, on the user interface 53, the mode from the normal idle mode to the PTT communication mode. More specifically, when the keys 80 receive a predetermined operation from a user, the user interface 53 displays, on the display 70, indications, one of which represents that the normal idle mode is currently set, and the other asks if the user wishes to switch the mode to the PTT mode. When the keys 80 receive, from the user, the operations for switching the mode to the PTT mode, the PTT control unit 51 detects, by the operations, that the PTT mode is set.

Next, the PTT communication control unit 51 signs in an IP network for the PTT communication (step S22). This sign-in operation includes a process in which the mobile station 100 requests and obtains an IP address from the IP network.

The IP network, which allocates an IP address to the mobile station 100, manages the IP address in relation to a mobile station ID which corresponds to the IP address.

After that, the PTT communication control unit 51 starts up the slot cycle switching unit 52, and registers a parameter change at the base station for changing the value of a Slot Cycle Index from 2 to 0 (step S23). This registration process is described in FIG. 3A in detail.

After signing in (step S30), the PTT communication control unit 51 transmits, to a base station 200, a Parameter Change Registration message for changing the Slot Cycle Index to 0 (step S31). The base station 200 receives the message, and stores the mobile station ID of the mobile station 100 in relationship to the value 0 for the Slot Cycle Index (step S32). Afterwards, the base station 200 transmits messages on the Paging Channel to the mobile station 100 with use of one slot in every Slot Cycle whose Slot Cycle length is 16 slots (1.28 sec). Accordingly, the mobile station 100 monitors the Paging Channel in the same cycles (step S33). By these operations, the structure of the Slot Cycle changes from that described in FIG. 4A to that described in FIG. 4B.

Note that the Slot Cycle Index is an index which defines the Slot Cycle length. The Slot Cycle is a cycle in which a mobile station operating in a Slotted mode monitors the Paging Channel at a constant frequency. The Slotted mode is an operation mode in which a mobile station monitors only a selected slot on the Paging Channel, which is used by a base station to transmit messages.

Figure 4A:
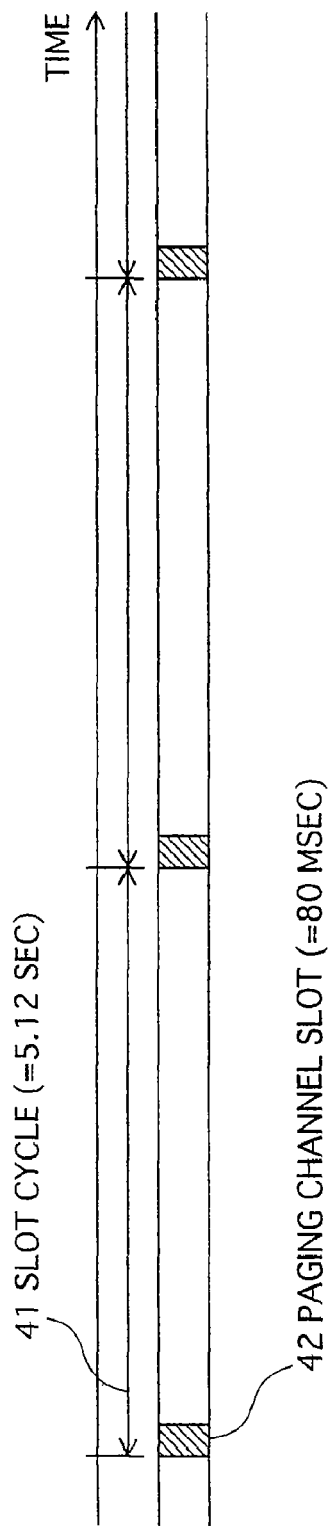
FIG. 4A represents a Slot Cycle in the case where the value of a Slot Cycle index is 2.

FIG. 4A represents a Slot Cycle in the case where the value of the Slot Cycle Index is 2. In this case, the number of the slots in each Slot Cycle is 64, and the duration time is 5.12 sec. Therefore, in the case where the value of the Slot Cycle Index is set to 2, the base station transmits, to the mobile station 100, messages with use of one Paging Channel Slot per 5.12 sec. The mobile station 100 monitors only the selected channel slot, and does not monitor the other slots in order to save power.

Figure 4B:
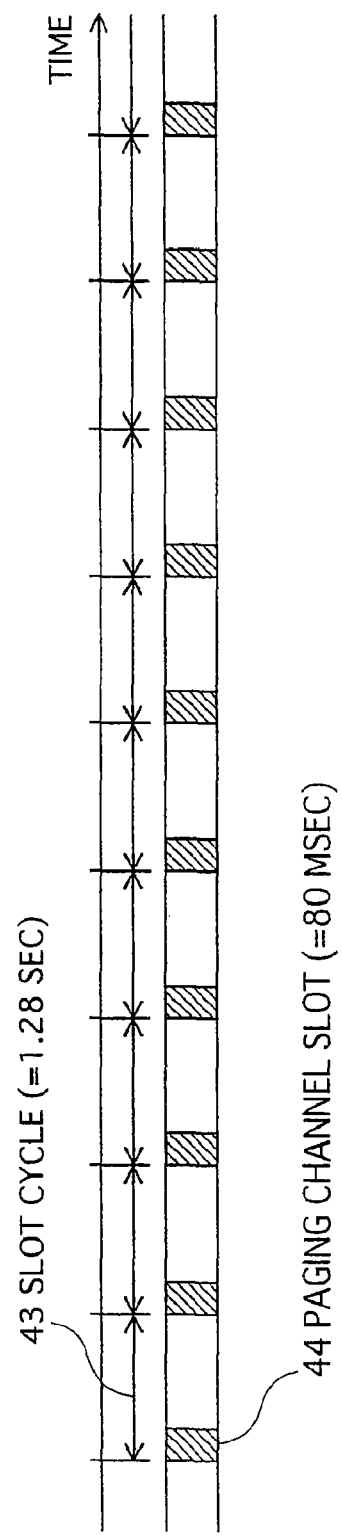
FIG. 4B represents a Slot Cycle in the case where the value of a Slot Cycle Index is 0.

FIG. 4B represents a Slot Cycle in the case where the value of the Slot Cycle Index is 0. In this case, the number of the slots in each Slot Cycle becomes 16, and the duration time is 1.28 sec. Therefore, in the case where the value of the Slot Cycle Index is set to 0, the base station transmits, to the mobile station 100, messages with use of one Paging Channel Slot per 1.28 sec, and the mobile station 100 monitors the selected channel slot.

Then, the PTT communication control unit 51 performs a PTT communication process for receiving and transmitting voice packets (step S24). This process is described later with reference to FIG. 5.

In the case where the reception and transmission of voice packets are not performed for a predetermined period, or the case where the user makes request to cancel the PTT mode, the PTT communication control unit 51 finishes the PTT communication process, and the processing proceeds to step S26 (step S25).

Finally, the PTT communication control unit 51 signs out and releases the IP address (step S26), starts up the slot cycle switching unit 52, and performs a Parameter Change Registration for changing the value Slot Cycle Index back to 2 from 0 (step S27). This process is described in FIG. 3B in detail. After finishing these steps, the structure of the Slot Cycle changes from that described in FIG. 4B back to that described in FIG. 4A.

Figure 5:
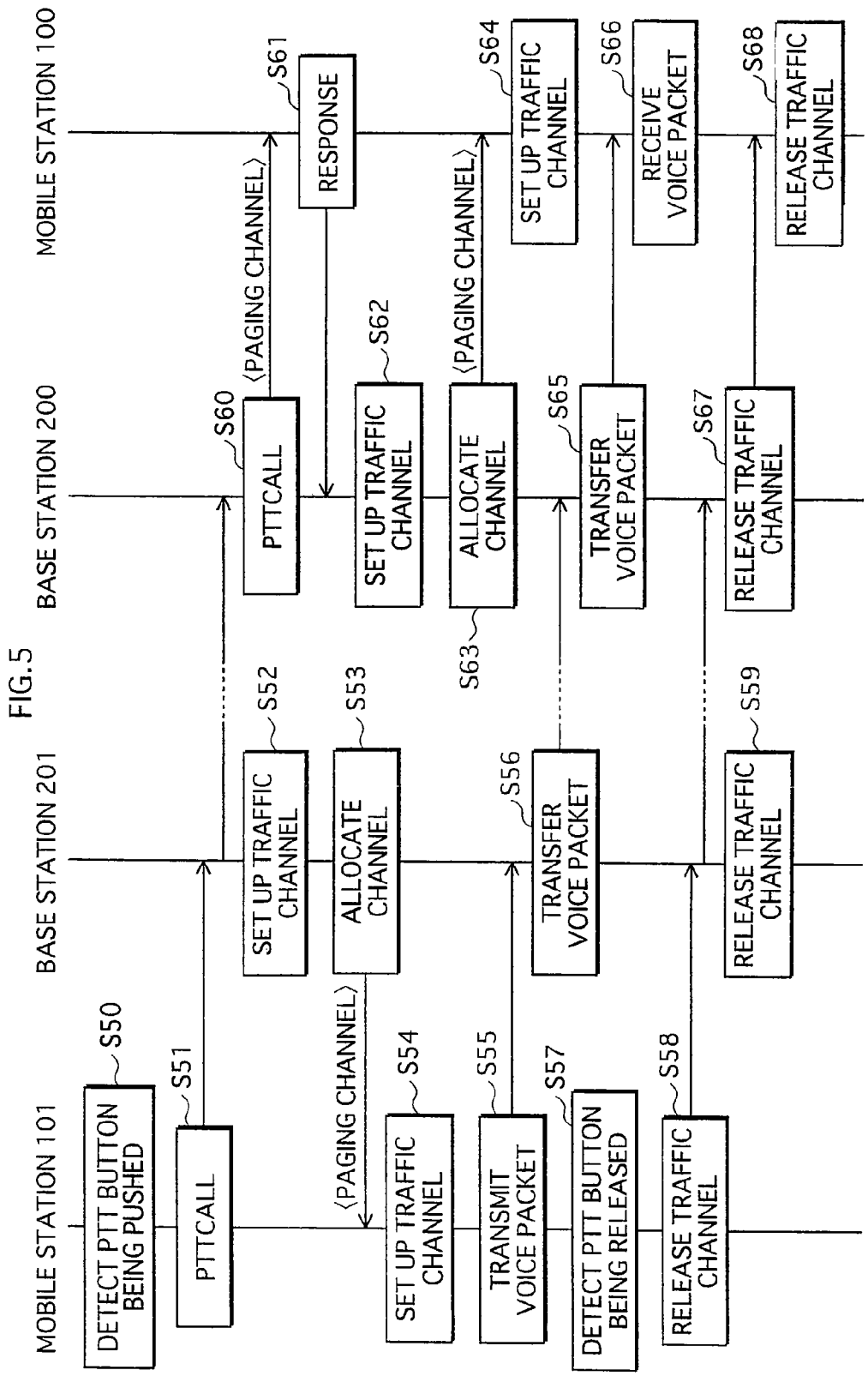
FIG. 5 is a sequence diagram showing details of a PTT communication process.

FIG. 5 is a sequence diagram showing the details of the PTT communication process. In FIG. 5, a case in which a user of a mobile station 101 speaks and a user of the mobile station 100 receives is taken for instance.

In FIG. 5, the mobile station 101 is a terminal device which provides the same PTT communication function as the Mobile station 100 provides. The mobile station 101 is in the service area of the base station 201, and the mobile station 100 is in the service area of the base station 200. The base station 200 and the base station 201 are connected to each other via a network for voice packet communication.

When the user of the mobile station 101 selects a party on the user interface 50 and pushes the PTT button, the user interface 50 detects that the PTT button is pushed (step S50). Triggered by this detection, the PTT communication control unit 51 transmits PTT CALL signal to the base station 201 in order to make a request for the allocation of a Traffic Channel (step S51).

The selection of a party is performed in the following manner:

During the PTT mode, the PTT communication control unit 51 included in the mobile station 101 is receiving information which indicates whether other members are signing in or not. Here, "other members" means mobile stations, including the mobile station 100, which are specified by IDs, such as phone numbers, by the user of the mobile station 101. When receiving predetermined operations from the user, the user interface 53 displays, on the display 70, a list showing which members are signing in with use of the information obtained by the PTT communication control unit 51. Then, when a member is selected by the user with operations to the key 80, the user interface 53 considers that a transmission target is selected, and notifies the PTT communication control unit 51 of the selected member at the time the PTT button is pushed.

Receiving the request from the PTT communication control unit 51, the base station 201 sets up a Traffic Channel between the base station 201 and the mobile station 101 (step S52), and allocates the Traffic Channel to the mobile station 101 (step S53). Also, the base station 201 notifies the base station 200 that the PTT CALL is transmitted by the mobile station 101.

The PTT communication control unit 51 sets up the allocated Traffic Channel (step S54), and converts a voice, which is inputted from the microphone 42 and digitized by the voice signal processing unit 40, into a voice packet, to which the IP address for the selected member is added by the modem unit 30. Then, the PTT communication control unit 51 transmits the voice packet on the Traffic Channel (step S55).

The base station 201 transfers the received voice packet to the base station 101 via the IP network (step S56).

After that, when detecting the release of the PTT button (step S57), the mobile station 101 releases the Traffic Channel between the mobile station 101 and the base station 201 (steps S58 and S59).

Meanwhile, receiving the PTT CALL signal from the mobile station 101, the base station 200 notifies the mobile station 100 of the reception (step S60). Then, when the mobile station 100 responds to the notification (step S61), the base station 200 sets up a Traffic Channel and allocates the Traffic Channel to the mobile station 100 (step S63). The mobile station 100 sets up the allocated Traffic Channel (step S64).

Then, the base station 200 transfers the voice packet, which is transferred from the base station 201, to the mobile station 100 (step S65), and the mobile station, which received the voice packet, reproduces the voice packet (step S65).

Then, receiving the notification from the base station 201 which notifies that the Traffic Channel is released, the base station 200 releases the Traffic Channel between the base station 200 and the mobile station 100 (steps S67 and S68).

In steps S53, S60 and S63 among the above-described processes, the base stations transmit messages to the mobile stations with use of the Paging Channel Slots. These Paging Channel slots are shorter than usual during the PTT mode as shown in FIG. 4B. Therefore, the waiting time of the cycle while each of steps S53, S60 and S63 is processed is shorter than that of normal idle mode. More specifically, the waiting time in the PTT mode becomes 0.64 sec on average per one message transmission. As a result, the time required for transmitting voice packets from the mobile station 101 to the mobile station 100 becomes short.

The above explains the mobile station and the base station of the present invention based on the preferred embodiment. However, the present invention is not limited to the stated embodiment, and the following modifications are possible.

(1) The value of the Slot Cycle Index is not limited to the value described in the embodiment. As long as the Slot Cycle length during the PTT mode is shorter than that during the normal idle mode, any value is acceptable.

(2) In the above-described embodiment, the configurations of the mobile stations and the base stations do not allow processes for the PTT mode to be accepted during the normal idle mode, and do not allow processes for the normal idle mode to be accepted during the PTT mode. However, the configurations may be modified to realize the PTT mode and the normal idle mode at the same time.

(3) During the PTT mode, the Slot Cycle may be selectable by the user. For instance, during the PTT mode or the normal idle mode, or when receiving predetermined operations from the user, the user interface 53 displays, on the display 70, a list of Slot Cycles from short to long. When a cycle in the list is selected by the user and the PTT communication control unit 51 receives the operation, the PTT communication control unit 51 registers the parameter change at base station 200 for changing the value of the Slot Cycle Index to the value corresponding to the cycle selected by the user. Accordingly, both the base station 200 and the mobile station 100 switch the Slot Cycle. With the above operations, the user can select the Slot Cycle according to purposes, such as saving power or improving the response speed of a PTT CALL.

(4) The Slot Cycle of the PTT may be variable according to the remaining battery charge. For instance, when the user does not need to mind the remaining battery life such as in the case where the battery is being charged, the value of the Slot Cycle Index may be set to 0. Also, it is possible to set a threshold value at which the Slot Cycle is to be changed. In this case, while the remaining battery charge is more than the threshold value, the value of the Slot Cycle Index is being set to 0, and when the remaining battery charge becomes not more than the threshold value, the value of the Slot Cycle Index is set to 2.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mobile station which (i) monitors, in a monitor cycle, a paging channel slot which stores a message therein and is transmitted by a radio base station in a transmission cycle, and (ii) performs a process according to the message, comprising:
    a PTT setting reception unit operable to receive a PTT setting operation from a user for setting a PTT (Push to Talk) mode, in which a voice packet communication is available;
    a monitor cycle switching unit operable to switch, when the PTT setting reception unit receives the PTT setting operation, the monitor cycle to a predetermined short cycle which is for the PTT mode and shorter than cycles for other modes;
    a PTT communication processing unit operable to perform, when the PTT setting reception unit receives the PTT setting operation, PTT communication processing that is processing for transmission and reception of a voice packet and includes voice reproduction processing through which the PTT communication processing unit receives a voice packet which is transmitted from the radio base station after a PTT CALL is detected in the message, and reproduces a voice based on the voice packet, the PTT CALL being a request for the voice packet communication; and
    a control unit operable, when a predetermined period has elapsed without transmission nor reception of a voice packet from a start of the PTT communication processing, to have the PTT communication processing unit finish the PTT communication processing and to have the monitor cycle switching unit change the predetermined short cycle back to the monitor cycle which has been used until the PTT setting reception unit receives the PTT setting operation.

2. The mobile station of claim 1, further comprising:
    a sign-in unit operable to transmit an allocation request to the radio base station when the PTT setting reception unit receives the PTT setting operation, the allocation request being for allocating, to the mobile station, an IP address which is required for the voice packet communication; and
    a sign-out unit operable to transmit a release request to the radio base station when the predetermined period has elapsed without transmission nor reception of a voice packet from the start of the PTT communication processing, the release request being for releasing the IP address allocated to the mobile station.

3. The mobile station of claim 2, wherein
    the sign-in unit transmits, to the radio base station, slot cycle index information when the PTT setting reception unit receives the PTT setting operation, the slot cycle index information specifying the transmission cycle.

4. The mobile station of claim 3, further comprising:
    a cycle selection reception unit operable to receive a cycle selection by a user, the cycle selection specifying a cycle which is to be applied as the monitor cycle for the PTT mode, the cycle being shorter than the cycles for other modes, wherein
    the slot cycle index information indicates the cycle specified by the cycle selection, and
    the monitor cycle switching unit switches the monitor cycle to the cycle specified by the cycle selection when the PTT setting reception unit receives the PTT setting operation.

5. The mobile station of claim 1, further comprising:
    a transmission request reception unit operable to receive, from the user, a transmission request which specifies a transmission destination and instructs the mobile station to transmit a voice packet to the transmission destination; and
    a voice packet transmission unit operable to transmit a voice packet according to a voice inputted by the user.

6. The mobile station of claim 2, further comprising
    a PTT cancel reception unit operable to receive a PTT cancel operation from the user for canceling the PTT mode, wherein
    the sign-out unit transmits the release request to the radio base station when the PTT cancel reception unit receives the PTT cancel operation, and
    the monitor cycle switching unit switches the monitor cycle to a predetermined long cycle which is longer than a cycle at a time of receiving the PTT cancel operation.

7. A mobile station which monitors, in a monitor cycle, a paging channel slot which stores a message therein and is transmitted by a radio base station in a transmission cycle, and performs a process according to the message, comprising:
    a PTT setting reception unit operable to receive a PTT setting operation from a user for setting a PTT (Push to Talk) mode, in which a voice packet communication is available;
    a monitor cycle switching unit operable to switch, when the PTT setting reception unit receives the PTT setting operation, the monitor cycle to a predetermined short cycle which is for the PTT mode and shorter than cycles for other modes;
    a PTT communication processing unit operable to perform, when the PTT setting reception unit receives the PTT setting operation, PTT communication processing that is processing for transmission and reception of a voice packet and includes voice reproduction processing through which the PTT communication processing unit receives a voice packet which is transmitted from the radio base station after a PTT CALL is detected in the message, and reproduce a voice based on the voice packet, the PTT CALL being a request for the voice packet communication;

a cycle list displaying unit operable to display a list of a plurality of candidates for the predetermined short cycle; and a cycle selection reception unit operable to receive a user selection of a monitor cycle at least (i) when the mobile station is in a normal idle mode, (ii) when the PTT mode is set, and (iii) when a predetermined operation is input by the user, wherein when the cycle selection reception unit receives as the user selection a selection of one of the plurality of candidates in the list, the monitor cycle switching unit switches the monitor cycle to the selected one of the plurality of candidates.

8. The mobile station of claim 7, further comprising:

a sign-in unit operable to transmit an allocation request to the radio base station when the PTT setting reception unit receives the PTT setting operation, the allocation request being for allocating, to the mobile station, an IP address which is required for the voice packet communication.

9. The mobile station of claim 8, wherein the sign-in unit transmits, to the radio base station, slot cycle index information when the PTT setting reception unit receives the PTT setting operation, the slot cycle index information specifying the transmission cycle.

10. The mobile station of claim 9, wherein the slot cycle index information indicates a cycle that is specified by a user and is to be applied as the monitor cycle for the PTT mode, the cycle being shorter than the cycles for other modes, and the monitor cycle switching unit switches the monitor cycle to the cycle specified by the user via the cycle selection reception unit when the PTT setting reception unit receives the PTT setting operation.

11. The mobile station of claim 7, further comprising:

a transmission request reception unit operable to receive, from the user, a transmission request which specifies a transmission destination and instructs the mobile station to transmit a voice packet to the transmission destination; and a voice packet transmission unit operable to transmit a voice packet according to a voice inputted by the user.

12. The mobile station of claim 8, further comprising:

a PTT cancel reception unit operable to receive a PTT cancel operation from the user for canceling the PTT mode; and a sign-out unit operable to transmit a release request to the radio base station when the PTT cancel reception unit receives the PTT cancel operation, the release request being for releasing the IP address allocated to the mobile station, wherein the monitor cycle switching unit switches the monitor cycle to a predetermined long cycle which is longer than a cycle at a time of receiving the PTT cancel operation.

13. A mobile station which (i) monitors, in a monitor cycle, a paging channel slot which stores a message therein and is transmitted by a radio base station in a transmission cycle, and (ii) performs a process according to the message, comprising:

a PTT setting reception unit operable to receive a PTT setting operation from a user for setting a PTT (Push to Talk) mode, in which a voice packet communication is available;

a PTT communication processing unit operable to perform, when the PTT setting reception unit receives the PTT setting operation, PTT communication processing that is processing for transmission and reception of a voice packet and includes voice reproduction processing through which the PTT communication processing unit receives a voice packet which is transmitted from the radio base station after a PTT CALL is detected in the message, and reproduces a voice based on the voice packet, the PTT CALL being a request for the voice packet communication;

a judging unit operable to judge whether a remaining charge of a battery as a power source of the mobile station is greater than a predetermined threshold or not; and a monitor cycle switching unit operable to switch, when the remaining charge decreases from a value greater than the predetermined threshold to a value no greater than the predetermined threshold, the monitor cycle to a longer cycle than a cycle at a time the battery charge is greater than the predetermined threshold, the monitor cycle switching unit can switch, when the battery is being charged, the monitor cycle to a shorter cycle than a cycle at a time when the battery is not being charged.

14. The mobile station of claim 13, further comprising:

a sign-in unit operable to transmit an allocation request to the radio base station when the PTT setting reception unit receives the PTT setting operation, the allocation request being for allocating, to the mobile station, an IP address which is required for the voice packet communication.

15. The mobile station of claim 14, wherein the sign-in unit transmits slot cycle index information to the radio base station when the monitor cycle is switched by the monitor cycle switching unit.

16. The mobile station of claim 13, further comprising:

a transmission request reception unit operable to receive, from the user, a transmission request which specifies a transmission destination and instructs the mobile station to transmit a voice packet to the transmission destination; and a voice packet transmission unit operable to transmit a voice packet according to a voice inputted by the user.

17. The mobile station of claim 14, further comprising:

a PTT cancel reception unit operable to receive a PTT cancel operation from the user for canceling the PTT mode; and a sign-out unit operable to transmit a release request to the radio base station when the PTT cancel reception unit receives the PTT cancel operation, the release request being for releasing the IP address allocated to the mobile station.

\* \* \* \* \*